Feb. 2, 1932. E. J. DE PREE ET AL 1,843,212

ART OF FILTRATION

Original Filed Aug. 13, 1927

Inventor;
Edward J De Pree,
and Gerrit John Van Zoeren,

Patented Feb. 2, 1932

1,843,212

UNITED STATES PATENT OFFICE

EDWARD J. DE PREE AND GERRIT JOHN VAN ZOEREN, OF HOLLAND, MICHIGAN

ART OF FILTRATION

Application filed August 13, 1927, Serial No. 212,798. Renewed June 27, 1931.

This invention relates to the art of filtration and particularly to suction filtration.

Figure 1:
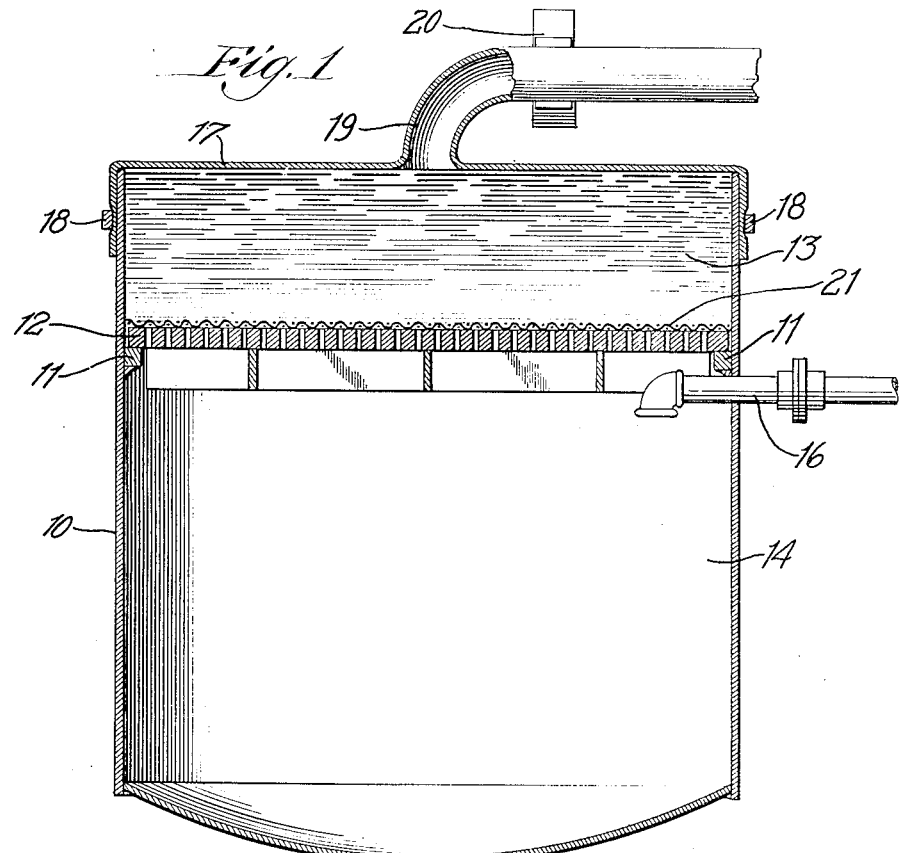
Figure 2:
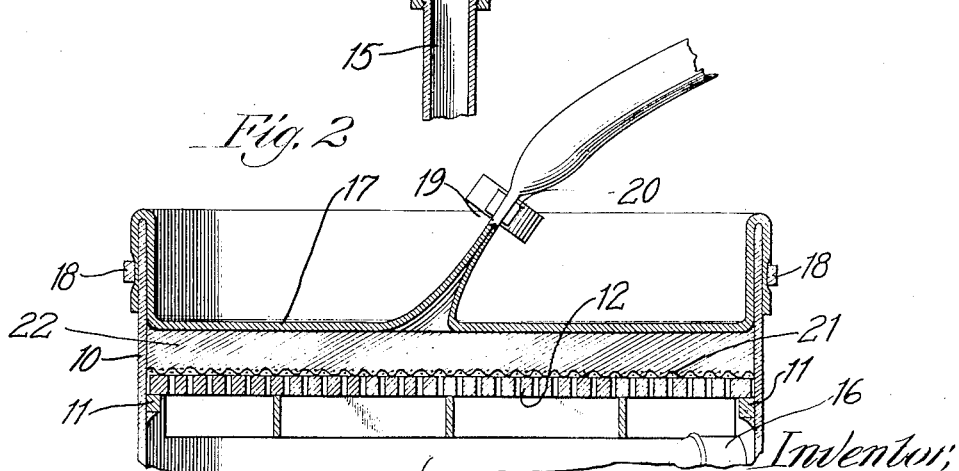

The invention will be readily understood from the description of a preferred form illustrated by the accompanying drawings, in which:

Figure 1 is a sectional view of a suction filter according to the invention; and Fig. 2 is a fragmentary sectional view similar to Fig. 1, showing a different stage of filtration.

Referring to the drawings, the filter assembly comprises a casing 10, open at its upper end and provided internally at an intermediate point with a ledge 11 which supports a perforated transverse partition 12 which divides the casing into an upper filtering receptacle 13 and a lower suction chamber 14. The chamber 14 is provided at its bottom with an outlet 15 for the filtrate and at an elevated point with a suction pipe 16 which may be connected to a suitable suction device (not shown).

An impervious, flexible and readily extensible membrance 17, suitably a sheet of India rubber, is applied to the open end of the casing 10 and is firmly held thereto by means of a band of India rubber 18 or other suitable clamping means. The membrane 17 has preferably united thereto a conduit 19 which may suitably be of India rubber also. The conduit 19 is provided with suitable closing means 20, for example, a clamp of known form. In use a filter medium, for example, filter cloth 21 is applied to the perforated bottom 12.

The apparatus may be used in numerous ways. For example, the liquid mixture to be filtered may be run into the receptacle 13 and the membrane 17 applied thereover, the conduit 19, if any, being closed. The outlet 15 is closed by suitable means (not shown) and suction is applied by pipe 16. The liquid is thus drawn through the filter medium 21 and the perforated partition 12, forming a filter cake 22 as shown in Fig. 2. The suction also causes the membrane 17 to follow the liquid surface until finally it rests upon the top of said filter cake and presses the same against the filter medium 21 preventing fissuring or the occurrence of cracks therein. Thus the whole cake is subjected to uniform suction and the removal of the liquid is rendered much more perfect by the atmospheric pressure on the membrane, which materially aids in the removal of the liquid.

After the filter cake has been formed, and compressed by the membrane 17, the clamp 20 may be opened and air or other gas allowed to pass through the cake, if desired. The admission of the gas permits the membrane 17 to withdraw from the cake.

In another mode of operation, the membrane 17 is first applied to the casing 10 and the liquid to be filtered is supplied through the conduit 19 until a cake of desired thickness is produced. Thereupon, the clamp 20 is closed and the cake is drained, the membrane being drawn down by the suction and exerting a consolidating force on the filter cake with the results hereinbefore described.

This latter method is of great utility where it is necessary to perform the filtration in the absence of air. For this purpose suction is applied by pipe 16 and nitrogen or other inert gas is supplied by conduit 19 until the apparatus is free from air. Thereupon, the conduit 19 is connected to the supply of liquid and the operation conducted as described.

After filtration is complete and the cake sufficiently dry, the casing 10 may be filled with nitrogen or other inert gas, introduced through conduit 19 or pipe 16. When using filters of the Büchner type, in which the upper filter receptacle 13 is separable, said receptacle may be detached and removed bodily to a chamber filled with inert gas, without admission of air to the solid material. Said material may be further dried or otherwise treated in an inert atmosphere.

Although the present invention has been described in connection with the details of a specific embodiment thereof, it is not intended that such details shall be regarded as limitations upon the scope of the invention except in so far as they are included in the accompanying claims.

We claim:

1. In combination, a filter receptacle having a filter member and vertical walls extending thereabove, means for applying suction to the underside of said filter member, an extensible impervious member extending over said receptacle and held to the sides thereof to normally form a cover for said receptacle spaced above the filter member, said impervious member being adapted to follow the filtering liquid and press the filter cake against said filter member and prevent cracking or fissuring therein, and means for introducing filtering liquid between said filter member and said impervious member.

2. In combination, a vacuum receptacle, an open filtering receptacle thereabove, a filtering surface between said receptacles, an extensible impervious membrane over said filtering receptacle and normally forming a cover therefor, said membrane being adapted to follow the filtering liquid and bear upon the upper surface of the filter cake, means for introducing liquid to be filtered into said filtering receptacle between the filtering surface and the impervious membrane.

3. In combination, a filtering surface, means for maintaining fluid on one side thereof, means for applying suction to the other side, means adapted to follow said liquid and to press against the filter cake, a conduit attached to said following means for supplying filtering liquid to the filtering means and means for closing said conduit.

4. In combination, a filter receptacle having a filter member and vertical walls extending thereabove, means for applying suction to the underside of said filter member an extensible impervious member extending over said receptacle and held to the sides thereof, so as to follow the filtering liquid and press the filter cake against said filter member and prevent cracking or fissuring therein, a conduit united to said extensible member for supplying filtering liquid to the filter receptacle and means for closing said conduit.

5. In combination, a vacuum receptacle, an open filtering receptacle thereabove, a filtering surface between said receptacle, an extensible impervious membrane over said filtering receptacle and adapted to follow the filtering liquid and bear upon the upper surface of the filter cake, a conduit united to said membrane for supplying filtering liquid to the filtering surface and means for closing said conduit.

6. In combination, a filter receptacle comprising walls and a perforate bottom, a flexible extensible membrane over said receptacle and having united therewith a flexible conduit for supplying liquid to said filter receptacle and means for closing said conduit.

7. The method of filtering liquids from solids in the absence of air which comprises sealing a receptacle comprising a filtering surface with a movable extensible member, spaced from said filtering surface, displacing air from said receptacle by an inert gas, supplying liquid to be filtered through said filtering surface to the space between said filtering surface and said extensible sealing member, cutting off the supply of liquid to the space between said filtering surface and said extensible sealing member, withdrawing liquid through said filtering surface and causing the extensible sealing member to follow said liquid and bear against the filter cake.

8. The method of filtering liquids containing suspended solids in the absence of air which comprises sealing a receptacle comprising as one wall thereof a filtering surface with a movable extensible member substantially co-extensive with said surface and spaced therefrom, supplying liquid to be filtered into the space between said filtering surface and said extensible sealing member and withdrawing liquid through said filtering surface to form a filter cake on the latter, and cutting off supply of said liquid while producing a suction within said receptacle through the filtering surface, thereby causing the extensible sealing member to follow said liquid and bear against the filter cake.

9. The method of filtering liquids from solids in the absence of air which comprises sealing a receptacle having as one wall thereof a filtering surface having a movable, extensible member spaced therefrom, supplying inert gas within said receptacle to displace air therefrom, then supplying liquid to be filtered to said receptacle between said filtering surface and said extensible sealing member while applying suction through said filtering surface to withdraw liquid therethrough and form a filter cake thereupon, and cutting off the supply of liquid while continuing such application of suction, thereby causing the extensible sealing member to follow the liquid and bear against said filter cake.

In testimony we have hereunto set our hands this 1st day of August, 1927.

EDWARD J. DE PREE.
GERRIT JOHN VAN ZOEREN.